United States Patent Office.

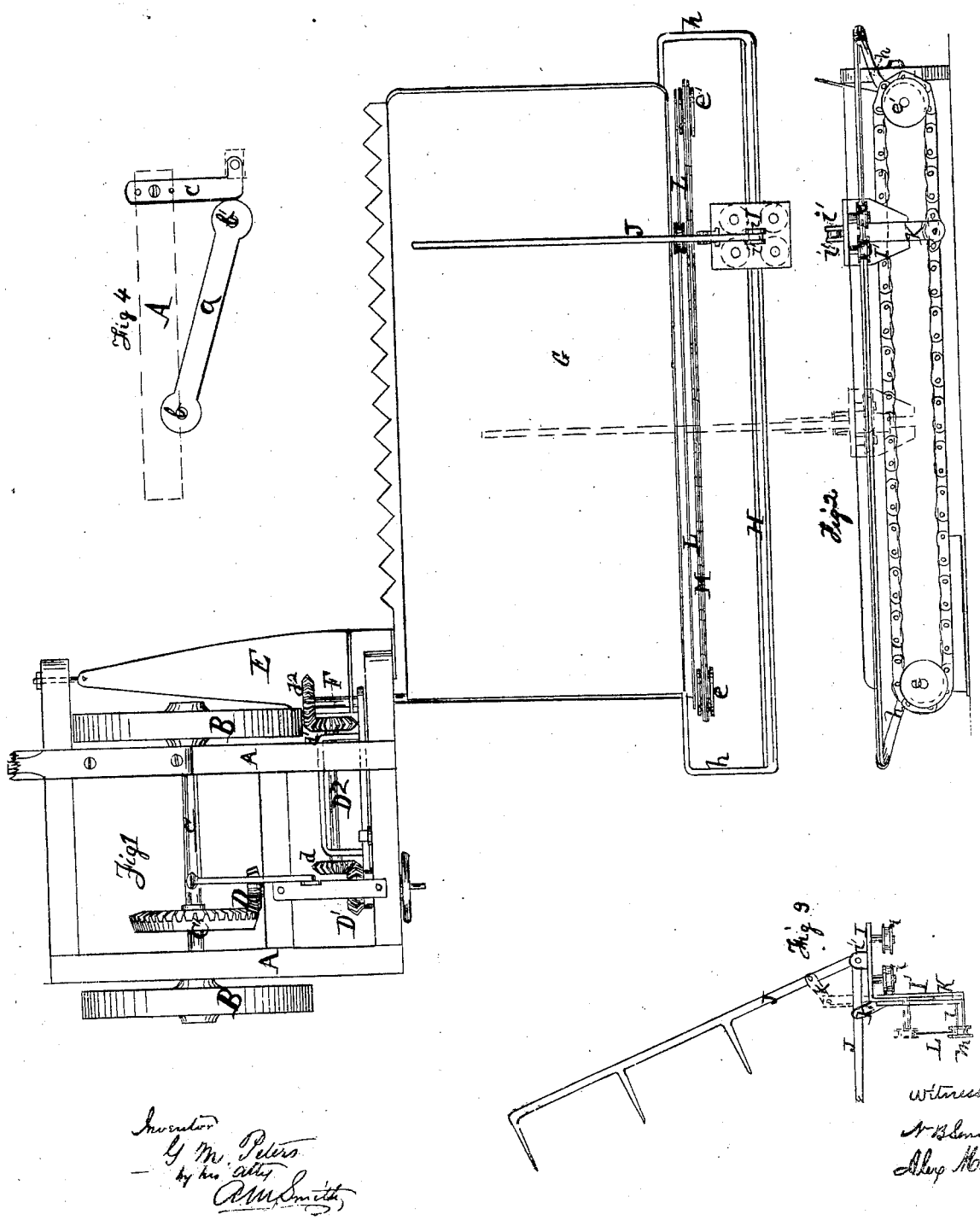

G. M. PETERS, OF GRANVILLE, OHIO.

*Letters Patent No. 69,476, dated October 1, 1867.*

---

IMPROVEMENT IN HARVESTER-RAKES.

---

*The Schedule referred to in these Letters Patent and making part of the same.*

---

TO ALL WHOM IT MAY CONCERN:

Be it known that I, G. M. PETERS, of Granville, in the county of Licking, and State of Ohio, have invented certain new and useful Improvements in Harvester-Rakes; and I do hereby declare the following to be a full and exact description thereof, reference being had to the accompanying drawing, in which—

Figure 1 is a plan or top view of a harvesting machine, with my improved rake attached.

Figure 2 is a rear elevation of the platform, showing the rake and its carriage in two positions, together with the means for operating the same.

Figure 3 is a side elevation of the rake and rake-carriage detached; and

Figure 4 is a detached view of some of the parts hereafter referred to.

Similar letters of reference denote corresponding parts in all the figures.

My invention relates to that class of rakes which discharge the grain at the side of the platform and behind the main frame of the machine, the rake reciprocating in ways or guides arranged in rear of the platform, and in a path parallel, or nearly parallel, with the cutting apparatus.

In the accompanying drawings, A represents the main frame of a harvesting machine; B B, the main supporting and driving-wheels; C, the main drive-wheel axle, provided with the main bevel-wheel C', which drives a bevel-pinion, D, on the crank-shaft, from which motion is communicated to the cutters in the usual manner. E is a drag-bar, to which the cutting apparatus is connected, attached at its forward end to an inner extension of the forward transverse bar of the frame, and in suitable uprights or bearings on said drag-bar is mounted the rake-driving shaft F, to which motion is communicated from a bevel-wheel, $D^1$, on the crank-shaft through bevel-wheel $d$, shaft $D^2$, and bevel-wheel $d^1$ to bevel-wheel $d^2$ on the forward end of shaft F, as shown by the drawings.

The machine represented, in its general construction, resembles that known as Ball's Ohio Machine, and for the purpose of adapting the driving mechanism to operate the rake equally well in all the varying positions of the platform and cutting apparatus in relation to the main frame provided for in such construction, the shaft $D^2$, with its bevel-wheel, is mounted in bearings in a coupling-arm, $a$, (see fig. 4,) which, at one end, $b$, embraces and is free to turn on the crank-shaft, and at its other end embraces and is free to turn on the rake-driving shaft F. The shaft F extends backward underneath the inner edge of the rectangular platform G, and is provided at its rear end with the pulley or sprocket-wheel $e$. $e'$ is a similar wheel or pulley, mounted at the outer end of the platform. H is a horizontal way or guide, arranged in rear of the platform, and connected thereto at each end by means of angular arms or extensions $h\ h$, in the manner shown by the drawings, figs. 1 and 2. I I' is an angular plate or carriage, provided, on its lower horizontal face, with four projecting pins or pivots, on which are mounted four grooved friction-rollers, $i\ i$, arranged in such manner as to closely embrace the rod or way H. On the upper face of the carriage I, in suitable lugs $i'\ i'$, the rear end of the rake-head J is pivoted. The vertical arm I' of the carriage I is slotted to receive a grooved slide, K, which, at its upper end, is connected by a link, $k$, to the rake-head J, (see fig. 3,) and, at its lower end, is provided with a horizontal arm, $l$, on the forward end of which is mounted the grooved wheel or friction-roller $m$, arranged to work back and forth and over and under the guide-plate L. M is an endless chain, working on pulleys $e\ e'$, and driven by pulley $e$ on the shaft F in a manner explained above. The arrangement of parts is such, as will be seen by inspection of the drawings, as to bring the chain or belt M into line with the arm $l$ on slide K, between the slide and the grooved roller $m$, and one of the links of the chain is perforated or otherwise adapted to receive or be connected to the arm $l$, which thus has communicated to it the movements of chain M.

The operation is as follows: Motion being communicated to chain M through the train of gearings described, or in other suitable manner, the arm $l$ is made to follow the movements thereof, and a reciprocating movement is imparted to the carriage I, and a reciprocating and falling movement of the rake-head, as follows, viz: Supposing the rake to be at the outer end of the platform, and ready to commence its discharge stroke, the parts are then in position, shown by black lines, fig. 3, the roller, in working underneath the way or plate L, and serving, through the slide K and link $k$, to hold the rake down upon the platform, while the movement of the chain, from the outer to the inner end underneath the rollers, causes the necessary movement of the rake-carriage and rake to effect the discharge of the grain, when the carriage, having reached the inner end of way or guides H, the rising of the link in the chain to which arm $l$ is attached, in passing over the pulley $e$, causes the rake, through the vertical reciprocation of slide K, to be thrown up into the elevated position shown in red lines, fig. 3, when the roller, working over the guide L, causes the rake to be maintained in such elevated position for passing the grain on the platform and the falling grain until it reaches the outer end of said guide, when the position of the parts is reversed, and the operation repeated as before.

I have shown my rake attachment as adapted to that construction of machine known as "Ball's Ohio Reaper," but it will be obvious that it may be applied to any of the various constructions in common use.

What I claim, and desire to secure by Letters Patent, is—

1. The reciprocating rake-carriage I I', in combination with the reciprocating slide K and chain M, substantially as described.

2. The rake-head J, pivoted to the reciprocating carriage I I', in combination with the reciprocating slide K, operating as described.

3. The arrangement of the ways or guides H L, in relation to the platform and in combination with the rake-carriage and lifting slide, substantially as described.

4. The combination of the reciprocating and lifting rake J and carriage I, ways or guides H L, and endless chain M with the platform G, substantially as described.

G. M. PETERS.

Witnesses:
   JAS. L. COX, Jr.,
   I. R. PETERS.